US007177667B2

(12) United States Patent
Kim

(10) Patent No.: US 7,177,667 B2
(45) Date of Patent: Feb. 13, 2007

(54) ANTENNA REMOTE CONTROL APPARATUS OF MOBILE COMMUNICATION BASE STATION SYSTEM

(75) Inventor: Duk-Yong Kim, Yongin-si (KR)

(73) Assignee: KMW Inc., Hwaseong-si (KR)

( * ) Notice: Subject to any disclaimer, the term of this patent is extended or adjusted under 35 U.S.C. 154(b) by 389 days.

(21) Appl. No.: 10/721,956

(22) Filed: Nov. 25, 2003

(65) Prior Publication Data

US 2005/0113047 A1 May 26, 2005

(51) Int. Cl.
*H04B 1/38* (2006.01)

(52) U.S. Cl. ............ 455/561; 340/310.11; 340/310.15; 342/359

(58) Field of Classification Search ................ 455/561, 455/562; 340/310.11, 310.15; 342/359
See application file for complete search history.

(56) References Cited

U.S. PATENT DOCUMENTS 4,301,397 A * 11/1981 Journey ...................... 318/625
5,512,914 A * 4/1996 Hadzoglou et al. ......... 343/816
5,805,996 A * 9/1998 Salmela ...................... 455/453
6,078,824 A * 6/2000 Sogo ........................ 455/562.1
6,239,744 B1 * 5/2001 Singer et al. ............... 342/359
6,366,237 B1 * 4/2002 Charles ...................... 342/368
6,891,509 B2 * 5/2005 Rose et al. ................. 343/758
2003/0109231 A1 * 6/2003 Marcus et al. ................ 455/90
2004/0038714 A1 * 2/2004 Rhodes et al. ........... 455/562.1
2005/0134512 A1 * 6/2005 Gottl et al. ................. 343/757

* cited by examiner

*Primary Examiner*—Quochien B. Vuong
*Assistant Examiner*—Christian A. Hannon
(74) *Attorney, Agent, or Firm*—Cha & Reiter, LLC

(57) ABSTRACT

An antenna remote control apparatus for a base station in a mobile communication system is disclosed. The antenna remote control apparatus includes a remote controller for matching a driving voltage for a motor used to control the beam direction of an antenna, a reference signal for measuring the rotation state of the motor, and an RF signal for mobile communication and transmitting the matched signal via a feeder cable, and an antenna controller for receiving the matched signal from the remote controller via the feeder cable, dividing the matched signal into the reference signal, the motor driving voltage, and the RF signal, driving the motor using the motor driving voltage, and outputting a variation in the reference signal depending on the rotation state of the motor to the remote controller via the feeder cable. Therefore, there is no need for an additional cable for controlling the motor. Particularly, since a matcher for matching signals, a signal divider for dividing the matched signal, and a signal detector for detecting the rotation state of the motor are all configured as passive devices, cost is reduced.

14 Claims, 3 Drawing Sheets

ANTENNA REMOTE CONTROL APPARATUS OF MOBILE COMMUNICATION BASE STATION SYSTEM

BACKGROUND OF THE INVENTION

1. Field of the Invention

The present invention relates generally to an antenna remote control apparatus for a base station in a mobile communication system, and in particular, to an antenna remote control apparatus for transmitting on a feeder cable a control signal for controlling a motor mounted to an antenna to adjust the beam direction and tilting angle of the antenna in a base station of a mobile communication system.

2. Description of the Related Art

In general, the beam direction and tilting angle of an antenna are controlled to improve service quality in a mobile communication system. Traditionally, an operator goes up to an antenna installed on a high place and manually adjusts the antenna.

However, research has recently been undertaken into a technology of adjusting the beam direction and tilting angle of an antenna by remotely controlling a motor mounted to the antenna.

The motor can be a motor used to tilt the antenna mechanically, or a motor for driving a phase shifter that adjusts the vertical/horizontal tilting angle of beams by controlling the phase of each radiation device.

To control the motor equipped in the antenna, control signals need to be applied to the motor. Traditionally, a cable other than a feeder cable is additionally provided to transmit the motor control signals.

As described above, since an additional transmission line is required to transmit control signals to a motor that is mounted to an antenna and controls the beam direction and tilting angle of the antenna in the conventional technology, installation cost is high. Moreover, the use of many active devices in a transmitter/receiver for transmitting/receiving the control signals leads to low reliability.

SUMMARY OF THE INVENTION

An object of the present invention is to substantially solve at least the above problems and/or disadvantages and to provide at least the advantages below. Accordingly, an object of the present invention is to provide an antenna remote control apparatus that allows a feeder cable configured to supply power to an antenna to further deliver a motor control signal so that the antenna can be remotely controlled without using an additional transmission cable, and that implements a circuit for detecting the rotation state of the motor as a passive device to thereby increase reliability in a base station of a mobile communication system.

The above object is achieved by an antenna remote control apparatus for a base station in a mobile communication system. The antenna remote control apparatus includes a remote controller for matching a driving voltage for a motor used to control the beam direction of an antenna, a reference signal for measuring the rotation state of the motor, and an RF signal for mobile communication and transmitting the matched signal via a feeder cable, and an antenna controller for receiving the matched signal from the remote controller via the feeder cable, dividing the matched signal into the reference signal, the motor driving voltage, and the RF signal, driving the motor using the motor driving voltage, and outputting a variation in the reference signal depending on the rotation state of the motor to the remote controller via the feeder cable.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

Figure 1:
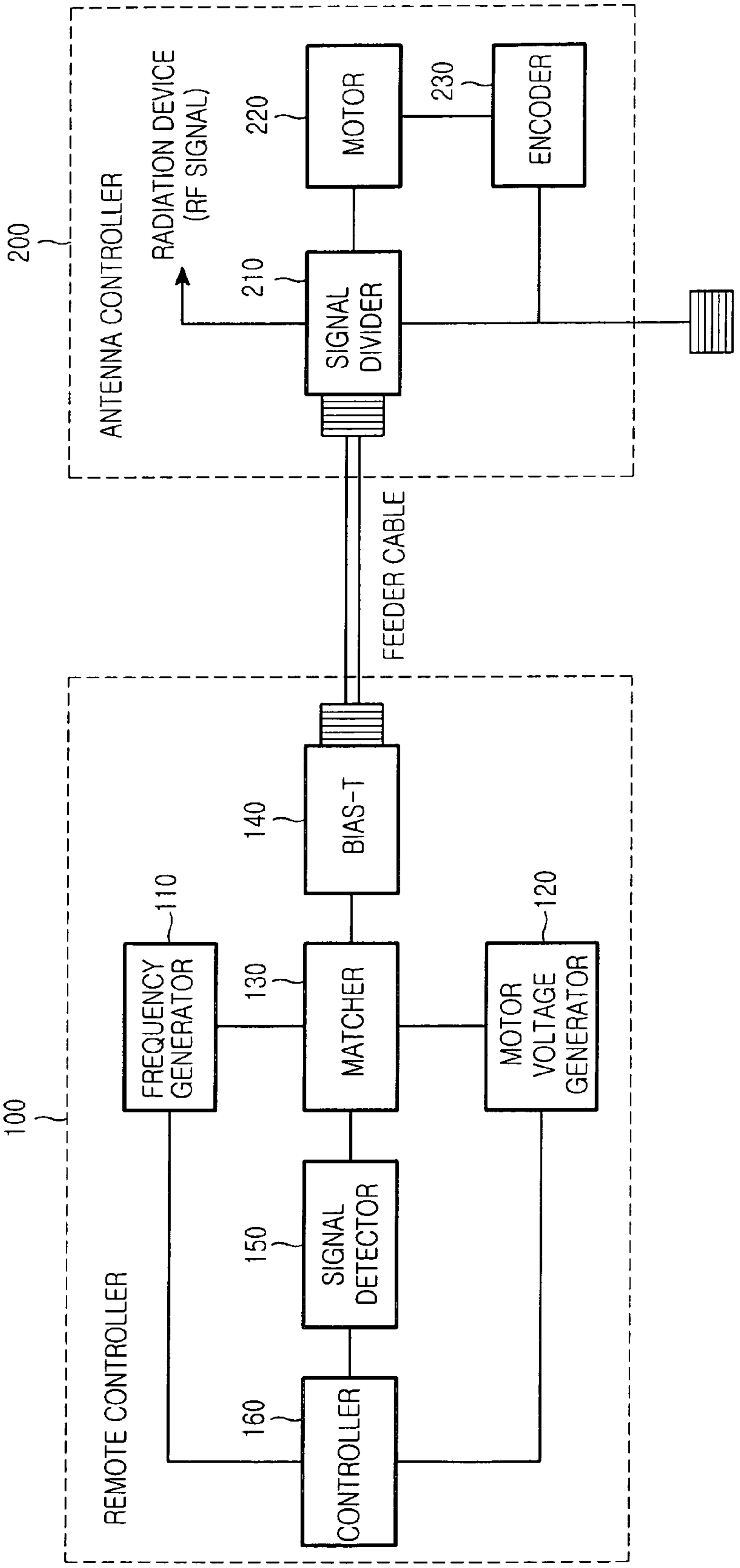
FIG. 1 is a block diagram of an antenna remote control apparatus according to an embodiment of the present invention.

FIG. 1 is a block diagram of an antenna remote control apparatus according to an embodiment of the present invention. As illustrated in FIG. 1, the antenna remote control apparatus comprises a remote controller 100 for transmitting a reference signal by which the rotation state of a motor for controlling the beam direction and tilting angle of an antenna is detected, a motor driving voltage, and an RF signal for mobile communication in combination via a feeder cable, and an antenna controller 200 for receiving the combined signal via the feeder cable, dividing the combined signal into the reference signal, the motor driving voltage and the RF signal, and separately providing the divided signals to thereby drive the motor, and transmitting a variation in the rotation state of the motor to the remote controller 100.

The remote controller 100 includes a frequency generator 110 for generating a sine wave signal being the reference signal by which the rotation state of the motor is measured, a motor voltage generator 120 for generating a voltage needed to drive the motor mounted to the antenna, an matcher 130 for summing the output of the frequency generator 110 and the output voltage of the motor voltage generator 120 without interference and receiving the variation in the rotation state of the motor, a bias T 140 for adding the output of the matcher 130 to the RF signal for mobile communication and transmitting the sum to the antenna via the feeder cable, a signal detector 150 for detecting the variation of the rotation state of the motor, received from the matcher 130 and converting the variation to a square wave signal, and a controller 160 for outputting a voltage and a control signal for driving the motor and receiving a control result value from the signal detector 150, thereby continuously controlling the motor voltage generator 120 and the frequency generator 110.

The antenna controller 200 includes a signal divider 210 for dividing the signal received from the bias T 140 via the feeder cable into an RF signal for mobile communication, a motor voltage signal for driving the motor, and a sine wave signal for use as a reference signal for variations in the beam direction and tilting angle of the antenna, a motor 220 for being activated by the motor voltage signal and controlling the beam direction and the tilting angle of the antenna, and an encoder 230 for changing a resistance value according to the rotation state of the motor 220 and outputting a correspondingly changed sine wave signal to the matcher 130.

The operation of the antenna remote control apparatus according to the embodiment of the present invention will be described in detail with reference to FIGS. 2 and 3.

In operation, the motor voltage generator 120 outputs a motor driving voltage (e.g. DC±15V) according to a control signal from the controller 160. The frequency generator 110 outputs a predetermined frequency signal according to a control signal from the controller 160.

The frequency signal generated from the frequency generator 110 is assumed herein to be a low-frequency sine wave signal. Yet, it is not limited to a sine wave signal.

Figure 2:
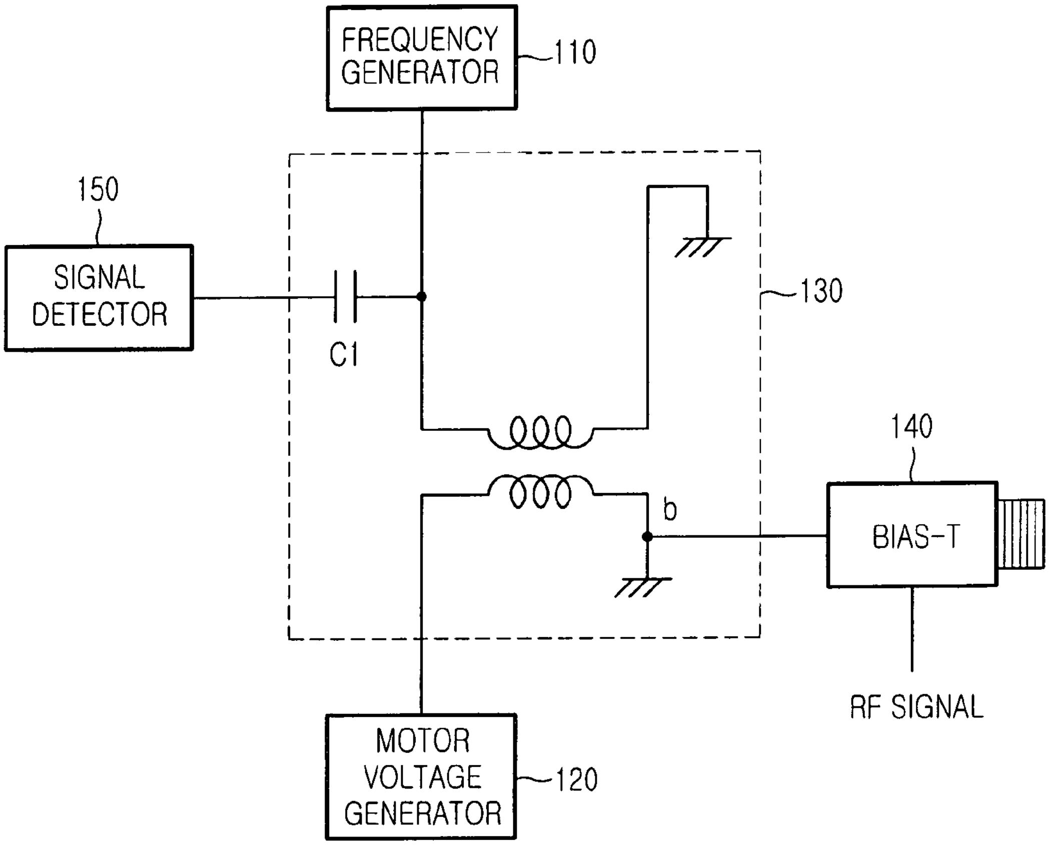
FIG. 2 is a detailed circuit diagram illustrating an matcher illustrated in FIG. 1.

The sine wave signal from the frequency generator 110 is applied to a contact b through a contact a in a transformer T1 used as the matcher 130, as illustrated in FIG. 2.

Since the motor driving voltage (e.g. DC±15V) has been applied to the contact b, the two signals together are fed to the bias T 140.

Aside from the transformer taken as an example in the embodiment of the present invention, the matcher 130 can be any of devices that match an AC signal and a DC signal. Therefore, the matcher 130 is not limited to the transformer.

The bias T 140 combines the output of the matcher 130, that is, the sine wave signal being an AC signal and the motor driving voltage being a DC signal, with the RF signal for mobile communication.

The output of the bias T 140 is provided to the antenna controller 200 via the feeder cable.

Figure 3:
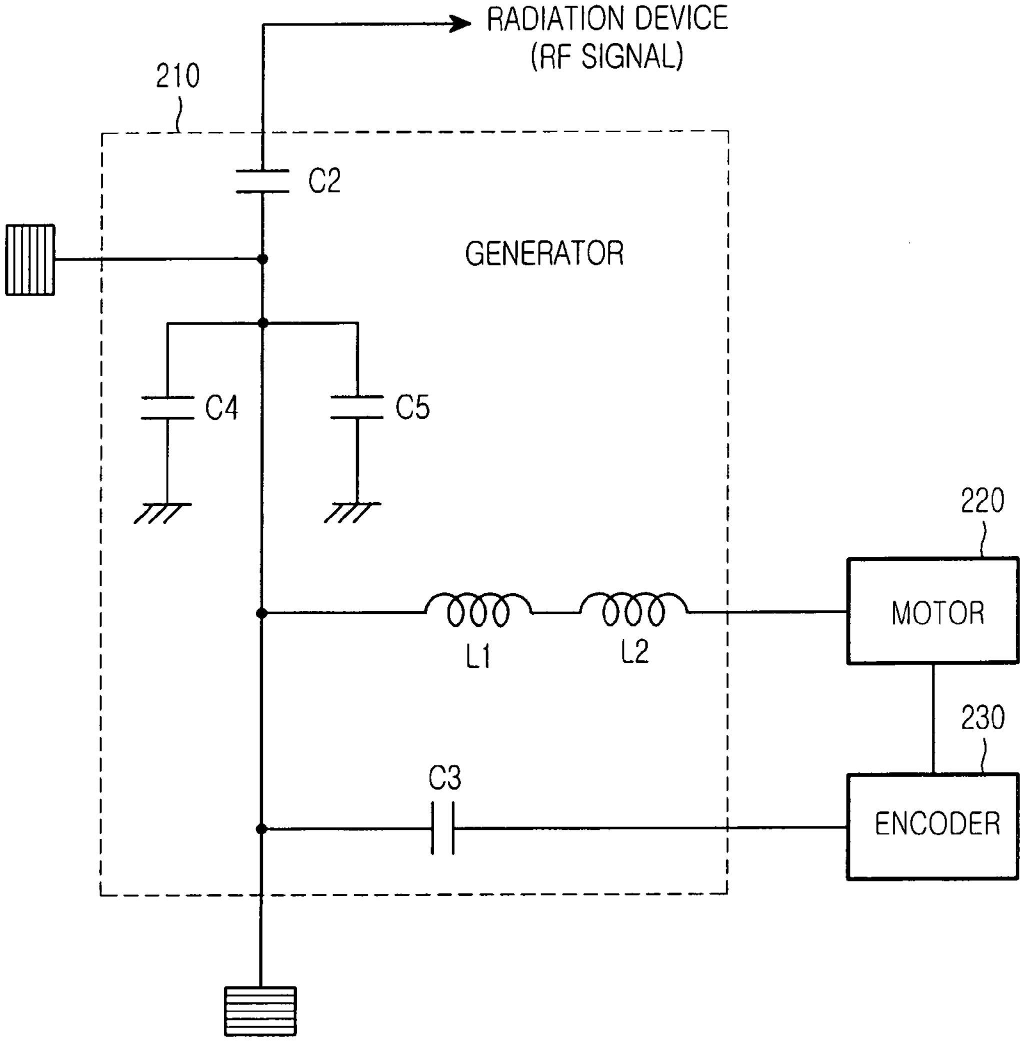
FIG. 3 is a detailed circuit diagram of a signal divider illustrated in FIG. 1.

The signal input to the antenna controller 200 via the feeder cable is divided into the RF signal, the motor driving voltage, and the sine wave signal by the signal divider 210, as illustrated in FIG. 3.

In other words, the RF signal is transmitted to each radiation device of the antenna via a capacitor C2.

The motor driving voltage is applied to the motor 220 via inductors L1 and L2.

The sine wave signal is applied to the encoder 230 via a capacitor C3. Notably, the RF signal is blocked by capacitors C4 and C5 so that it cannot be introduced to the motor 220 and the encoder 230.

This is implemented by setting the values of the capacitors C4 and C5 in the manner that passes the motor driving voltage and the low-frequency sine wave signal but blocks the RF signal.

The motor 220 is driven by the DC voltage received from the inductors L1 and L2. Its rotation direction is changed depending on the polarity of the applied power.

For example, if +15V is applied, the motor 220 rotates clockwise and if −15V is applied, the motor 220 rotates counterclockwise.

Along with the rotation of the motor 220, the encoder 230 outputs a variation according to the rotation state of the motor 220. The encoder 230 comprises only a plurality of resistors. It is configured to have different resistance values, that is, changed resistance values according to the forward and reverse rotation degrees of the motor 220.

The signal detector 150 receives a variation in the amplitude of the sine wave signal at the contact a via the capacitor C1, converts the variation to a square wave signal, and feeds it to the controller 160.

The controller 160 decides the beam direction and tilting angle of the antenna according to the detection signal received from the signal detector 150 and correspondingly performs a control operation.

Meanwhile, the remote controller 100 can be installed together with other devices in the base station, or provided separately.

In the latter case, the remote controller 100 may be controlled through a port P2 of the antenna controller 200.

While the invention has been shown and described with reference to a certain preferred embodiment thereof, it will be understood by those skilled in the art that various changes in form and details may be made therein without departing from the spirit and scope of the invention as defined by the appended claims.

In accordance with the present invention as described above, transmission of a motor control signal and a motor driving voltage via an existing feeder cable obviates the need for an additional cable, thereby reducing cost. Since the matcher 130 for matching signals, the signal divider for dividing the matched signals, and the signal detector for detecting the rotation state of the motor are all passive devices, the antenna remote control apparatus can be inexpensive and have high reliability.

What is claimed is:

1. An antenna remote control apparatus for a base station in a mobile communication system, comprising:

a remote controller for matching a driving voltage for a motor used to control the beam direction of an antenna, a reference signal for measuring the rotation state of the motor, and an RF signal for mobile communication and transmitting the matched signal via a feeder cable; and an antenna controller for receiving the matched signal from the remote controller via the feeder cable, dividing the matched signal into the reference signal, the motor driving voltage, and the RF signal, driving the motor using the motor driving voltage, and outputting a variation in the reference signal depending on the rotation state of the motor to the remote controller via the feeder cable, wherein the remote controller comprises a frequency generator for generating the reference signal to measure the rotation state of the motor that controls the beam direction and tilting angel of the antenna;

a motor voltage generator for generating the driving voltage required to drive the motor mounted to the antenna;

a matcher for combining the output of the frequency generator with the output voltage of the motor voltage generator without interference and receiving the variation in the rotation state of the motor from the antenna controller;

a bias T for combining the output of the matcher with the RF signal and outputting the combined signal to the antenna controller via the feeder cable;

a signal detector for detecting the variation in the rotation state of the motor from the signal received from the matcher, converting the variation to a square wave signal, and outputting the square wave signal; and a controller for outputting a voltage and control signal for driving the motor and receiving a control result value from the signal detector, thereby continuously controlling the motor voltage generator and the frequency generator.

2. The antenna remote control apparatus of claim 1, wherein the antenna controller comprises:

a signal divider for receiving the output signal of the bias T via the feeder cable, dividing the received signal into the RF signal for mobile communication, the motor driving voltage signal for driving the motor, and the reference signal for a variation in the beam direction and tilting angle of the antenna, and outputting the divided signals;

the motor for being driven upon receipt of the motor driving voltage from the signal divider to control the beam direction and tilting angle of the antenna; and an encoder for changing a resistance value thereof according to the rotation state of the motor and outputting the reference signal changed according to the changed resistance value to the matcher.

3. The antenna remote control apparatus of claim 1, wherein the antenna controller comprises:

a signal divider for receiving the output signal of the bias T via the feeder cable, dividing the received signal into the RF signal for mobile communication, the motor driving voltage signal for driving the motor, and the reference signal for a variation in the beam direction and tilting angle of the antenna, and outputting the divided signals;

the motor for being driven upon receipt of the motor driving voltage from the signal divider to control the beam direction and tilting angle of the antenna; and an encoder for changing a resistance value thereof according to the rotation state of the motor and outputting the reference signal changed according to the changed resistance value to the matcher.

4. The antenna remote control apparatus of the claim 1, wherein the matcher is a transformer.

5. The antenna remote control apparatus of the claim 1, wherein the signal divider comprises:

a capacitor C2 for passing the RF signal to a radiation device of the antenna;

inductors L1 and L2 for passing the motor driving voltage to the motor;

a capacitor C3 for passing the reference signal to the encoder; and capacitors C4 and C5 for blocking the RF signal from the motor and the encoder.

6. The antenna remote control apparatus of the claim 3, wherein the matcher is a transformer.

7. The antenna remote control apparatus of the claim 3, wherein the signal divider comprises:

a capacitor C2 for passing the RF signal to a radiation device of the antenna;

inductors L1 and L2 for passing the motor driving voltage to the motor;

a capacitor C3 for passing the reference signal to the encoder; and capacitors C4 and C5 for blocking the RF signal from the motor and the encoder.

8. An antenna remote control apparatus, comprising:

a remote controller combining a driving voltage for a motor used to control the beam direction of an antenna, a reference signal for measuring the rotation state of the motor, and an RF signal for mobile communication and transmitting the combined signal via a feeder cable; and an antenna controller receiving the combined signal from the remote controller via the feeder cable, dividing the combined signal into the reference signal, the motor driving voltage, and the RF signal, driving the motor using the motor driving voltage, and outputting a variation in the reference signal depending on the rotation state of the motor to the remote controller via the feeder cable, wherein the remote controller including:

a frequency generator generating the reference signal to measure the rotation state of the motor that controls the beam direction and tilting angel of the antenna;

a motor voltage generator generating the driving voltage required to drive the motor mounted to the antenna;

a matcher combining the output of the frequency generator with the output voltage of the motor voltage generator and receiving the variation in the rotation state of the motor from the antenna controller;

a bias T combining the output of the matcher with the RF signal and outputting the combined signal to the antenna controller via the feeder cable; and a signal detector detecting the variation in the rotation state of the motor from the signal received from the matcher, converting the variation to a square wave signal, and outputting the square wave signal; wherein the remote controller outputs a voltage and control signal for driving the motor and receives a control result value from the signal detector, thereby continuously controlling the motor voltage generator and the frequency generator.

9. An antenna remote control apparatus for a base station in a mobile communication system, comprising:

a remote controller for combining a driving voltage for a motor used to control the beam direction of an antenna, a reference signal for measuring the rotation state of the motor, and an RF signal for mobile communication and transmitting the combined signal via a feeder cable; and an antenna controller for receiving the combined signal from the remote controller via the feeder cable, for dividing the combined signal into the reference signal, the motor driving voltage, and the RF signal, driving the motor using the motor driving voltage, and for outputting a variation in the reference signal depending on the rotation state of the motor to the remote controller via the feeder cable, wherein the antenna controller comprises:

a signal divider for receiving the output signal of the bias T via the feeder cable, dividing the received signal into the RF signal for mobile communication, the motor driving voltage signal for driving the motor, and the reference signal for a variation in the beam direction and tilting angle of the antenna, and outputting the divided signals;

the motor for being driven upon receipt of the motor driving voltage from the signal divider to control the beam direction and tilting angle of the antenna; and an encoder for changing a resistance value thereof according to the rotation state of the motor and outputting the reference signal changed according to the changed resistance value to the matcher.

10. The antenna remote control apparatus of claim 8, wherein the antenna controller comprises:

a signal divider for receiving the output signal of the bias T via the feeder cable, dividing the received signal into the RF signal for mobile communication, the motor driving voltage signal for driving the motor, and the reference signal for a variation in the beam direction and tilting angle of the antenna, and outputting the divided signals;

the motor for being driven upon receipt of the motor driving voltage from the signal divider to control the beam direction and tilting angle of the antenna; and an encoder for changing a resistance value thereof according to the rotation state of the motor and outputting the reference signal changed according to the changed resistance value to the matcher.

11. The antenna remote control apparatus of the claim 8, wherein the matcher is a transformer.

12. The antenna remote control apparatus of the claim 8, wherein the signal divider comprises:

a capacitor C2 for passing the RF signal to a radiation device of the antenna;

inductors L1 and L2 for passing the motor driving voltage to the motor;

a capacitor C3 for passing the reference signal to the encoder; and capacitors C4 and C5 for blocking the RF signal from the motor and the encoder.

13. The antenna remote control apparatus of the claim 10, wherein the matcher is a transformer.

14. The antenna remote control apparatus of the claim 10, wherein the signal divider comprises:

a capacitor C2 for passing the RF signal to a radiation device of the antenna;

inductors L1 and L2 for passing the motor driving voltage to the motor;

a capacitor C3 for passing the reference signal to the encoder; and capacitors C4 and C5 for blocking the RF signal from the motor and the encoder.

* * * * *